May 28, 1957  E. K. KING  2,793,447
FISHING BOBBER
Filed Dec. 6, 1956

LOADING POSITION

CASTING POSITION

FISHING POSITION

Edward K. King
INVENTOR.

BY *Clarence A. O'Brien*
*and Harvey B. Jacobson*
Attorneys

United States Patent Office 2,793,447
Patented May 28, 1957

2,793,447

FISHING BOBBER

Edward K. King, Winner, S. Dak.

Application December 6, 1956, Serial No. 626,737

3 Claims. (Cl. 43—43.14)

This invention relates to an improved fishing line bobber which is so constructed that it may be readily weighted and satisfactorily and desirably cast from ten to one hundred feet, more or less, with the aid of a suitably baited fishing line and rod, or pole, as the case may be.

To achieve the stated objective, the bobber is constructed to provide a simple one-piece body embodying a hollow shell, one end portion of which is encircled by a float. The shell is such that it defines a chamber which may be loaded and weighted with water. The thus filled chamber or shell then becomes a casting weight, making it possible to readily and effectually cast the bobber to the desired fishing spot. One end portion of the shell has an opening serving as a filler hole and a vent, and a ball check vale in the chamber cooperates with the opening to open and close the same in a predetermined manner. Bleeder ports at the opposite end of the shell serve to drain the water from the chamber, restoring the buoyancy needed to cause the bobber to float in the usual intended manner.

The invention also features an ear or lug at that end of the shell equipped with the bleeder ports which serves to permit the fishing line to be either tied thereto or slidably connected therewith, whichever is desirable. By tying one end of the line to the ear and then sliding the distal end of the usual eye-equipped fishing rod out close to the ear, the user may forcibly douse the float beneath the water in such a manner that the water chamber can be quickly and easily loaded with water.

Other features and advantages will become more readily apparent from the following description and the accompanying drawing.

Figure 1:
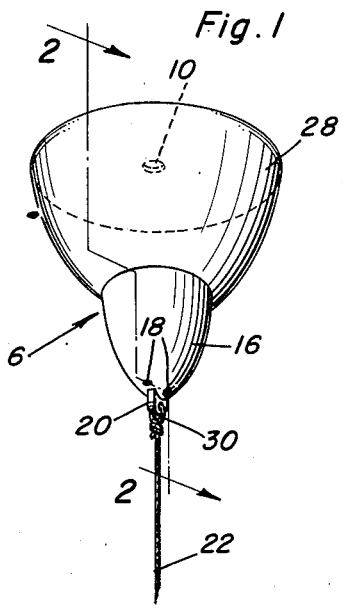
Fig. 1 is a perspective view of a bobber constructed in accordance with the principles of the invention.
Figure 3:
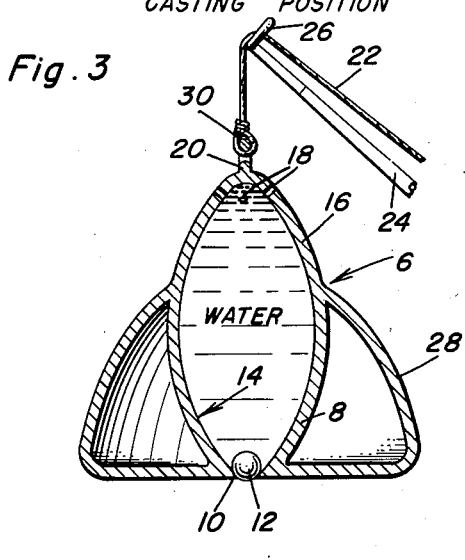
Fig. 3 is a view in section and similar to Fig. 2 showing the bobber inverted, the valve closed, and the bobber readied to be cast.
Figure 4:
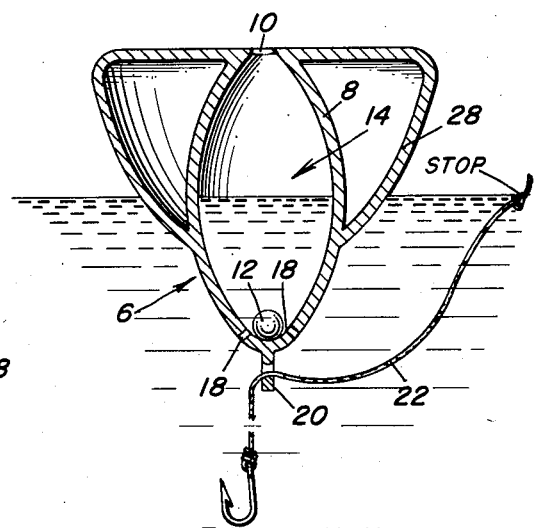
Fig. 4 is a view, also in section, showing the normal floating position of the bobber on the surface of the water.

The bobber as a structural entity is denoted by the numeral 6. It is of one-piece construction and may be made of suitable light weight material, for example, commercial plastics or the like. As is evident, the bobber is characterized by two distinguishable components, one of which is here designated as an egg-shaped hollow shell which defines a chamber which is adapted to be loaded with water in the manner seen in Figs. 2 and 3. One-half portion of the shell is denoted at 8 and in the end thereof there is an opening 10 which serves as a filler hole and also an air vent. The ball check valve, of suitable weight, is denoted at 12 and it is confined in the chamber 14. It shifts from the loading position seen in Fig. 2 to the valving position seen in Fig. 3 where the bobber is ready to be cast out with the line in a suitable manner. The other half portion of the shell is denoted at 16 and in the end thereof bleeding ports or orifices 18 are provided. At the same end there is a lug or ear 20 with which a cooperating portion of the line 22 connects. The line is used in conjunction with a fishing rod or pole 24 having the usual line guide eyes 26 thereon. The valved half portion 8 of the shell is encircled or surrounded by an endless annular hollow body portion 28 which is here conveniently designated as a float. The line may be tied as at 30 to the ear in the manner seen in Figs. 1, 2 and 3, or it may be slidable through the aperture in the ear in the manner seen in Fig. 4.

Figure 2:
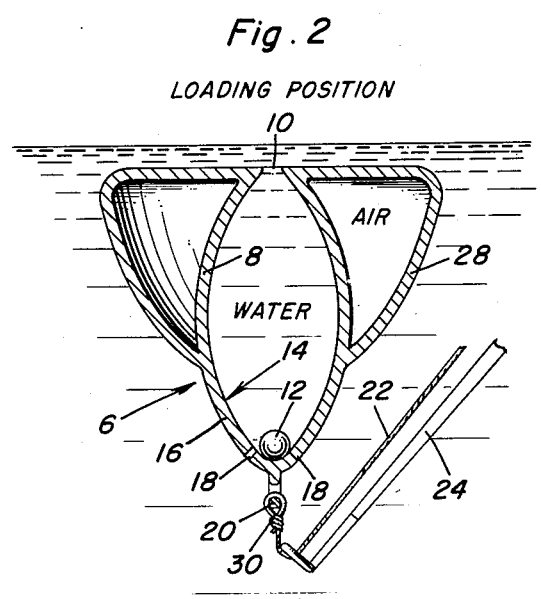
Fig. 2 is a view of the irregular section line 2—2 of Fig. 1 showing how with the aid of the line and rod the user may "dunk" the float in a body of water to conveniently fill the water containing chamber.

As before touched upon, the concept has to do with a novelly constructed fishing line bobber or float which is capable of being cast, in accordance with the desires of the fisherman, from ten to one hundred feet while on the line using either a pole or a rod. The bobber as seen in Fig. 2 may be submerged in the body of water using the rod and line in the manner to pull the ear-equipped end of the shell down into the water. This enables the chamber 14 of the shell to be filled with water by way of the ports 18, during which time the opening 10 functions as an air vent. When the pole is raised out of the water, the bobber turns over or inverts itself and the ball check valve 12 descends and seats itself in the opening 10, thus valving and closing the chamber and trapping the water therein. The water thus temporarily trapped provides the necessary added weight which enables the user to cast by swinging the rod in a manner to cause the line and float to travel in the usual manner. Manifestly, the heavier the loaded float, the farther one can cast it. The float hits the water in the floating position seen in Fig. 4 and the check valve descends and uncovers the opening 10 which then becomes a vent. The valve falls to the bottom as seen and the greater portion of water which has been previously trapped in the chamber 14 is bled therefrom by way of the bleeder ports 18. As already pointed out, the line can be tied to the bobber by way of the apertured ear or lug or can be free to go deeper by allowing the line to slide through the hole. If a certain leader length is desired below the float, a split shot or stop can be put on the line to maintain that depth. When the bobber is drawn in, the rod pushes the bobber under water and readies it for the next half without ever handling the bobber itself.

In practice, it is intended that the float may be made of transparent commercial plastics except the check valve, and this can be of glass or a rubber ball. It will be seen therefore that the invention is simple, practical, easy to build and load, and that the weight of the bobber can be varied depending upon the ever-varying fishing requirements.

The fact that the water load is trapped in the chamber, the bobber maintains its weight until it hits the water. This is an important function of the bobber. The casting of this bobber may be done overhand or tossed out underhand for a short distance to the spot desired to fish. Either way the bobber maintains its extra weight in flight.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing bobber comprising a buoyant body having a fishing line operatively connected thereto having a valved chamber which may be temporarily filled and weighted with water so that the body is then of adequate mass for effectual flight when it is cast by way of said fishing line, said chamber also having bleeder ports functioning to drain water from said chamber when the body lands on the water which is being fished.

2. A fishing bobber comprising a buoyant body having a hollow normally empty chamber having an opening at one end constituting a filler hole and also an air vent, a wall of said chamber having a plurality of bleeder ports at its opposite end for drainage of water contained in said chamber, means at the last-named end for attaching a fishing line to said body, and a ball check valve confined in said chamber and cooperable with said filler hole, whereby to permit one to load the chamber with water to impart sufficient weight to the body for effective casting results.

3. A fishing bobber comprising, in combination, a fishing rod having line guide eyes, a fishing line operatively connected at one end to said rod and passing slidingly through said guide eyes, and a bobber comprising a body having an egg-shaped hollow shell one end portion of which is encircled by an annular float, said shell being adapted to temporarily contain water and being provided at said one end with an opening constituting a filler hole and also serving as an air vent, and a ball check valve operatively confined in the chamber of said shell, the other end portion of said shell having a plurality of water bleeding ports and also having an outstanding ear to which the other end of said fishing line is attached References Cited in the file of this patent
UNITED STATES PATENTS

| | | |
|---|---|---|
| 2,509,704 | Streitwieser | May 30, 1950 |
| 2,763,088 | Cowsert | Sept. 18, 1956 |